Feb. 17, 1931.  E. M. BASSLER  1,793,449
FILTER
Filed Nov. 1, 1927  5 Sheets-Sheet 1
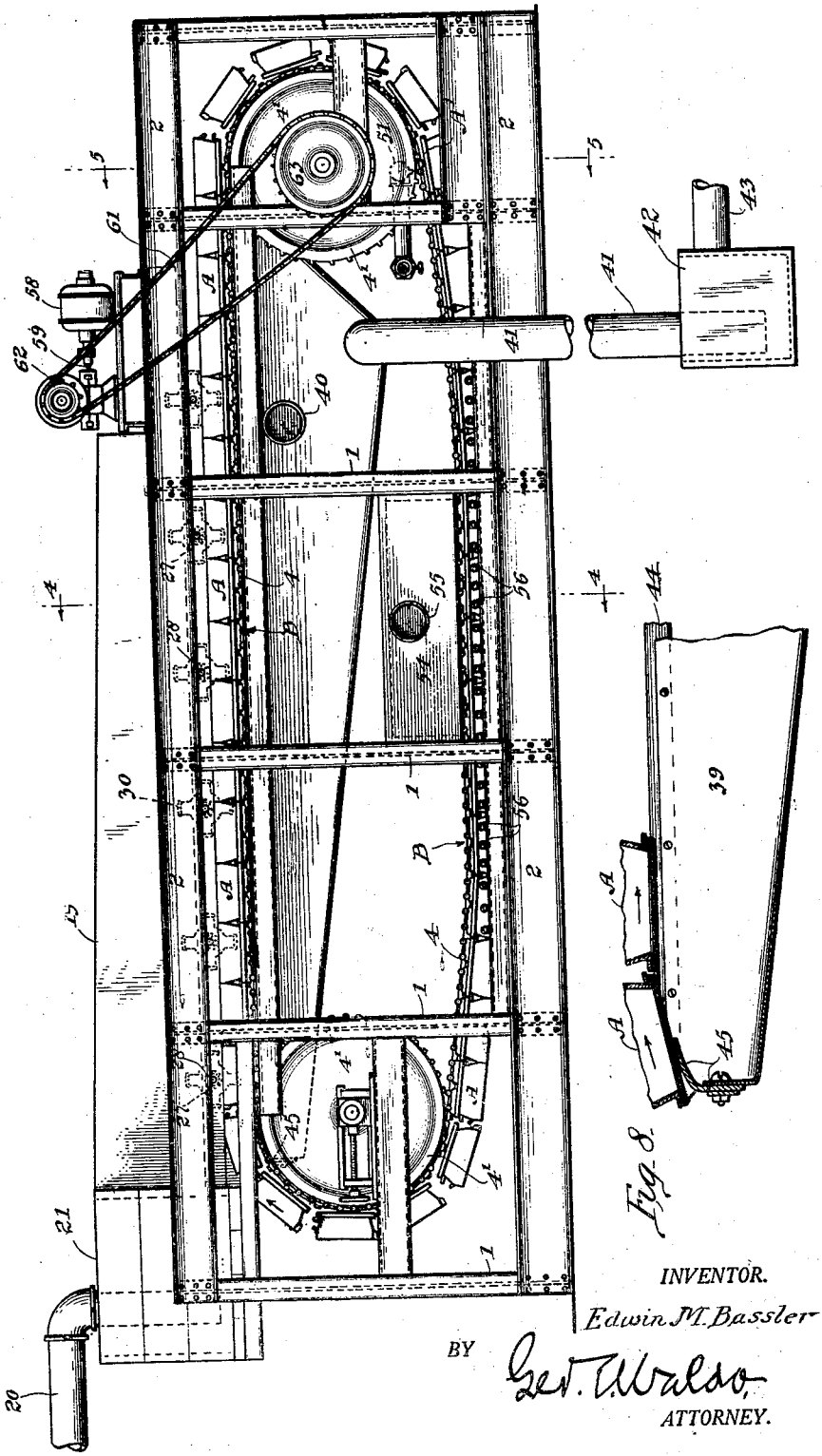
INVENTOR.
Edwin M. Bassler
BY
George T. Walso
ATTORNEY.

Feb. 17, 1931. E. M. BASSLER 1,793,449
FILTER
Filed Nov. 1, 1927 5 Sheets-Sheet 2
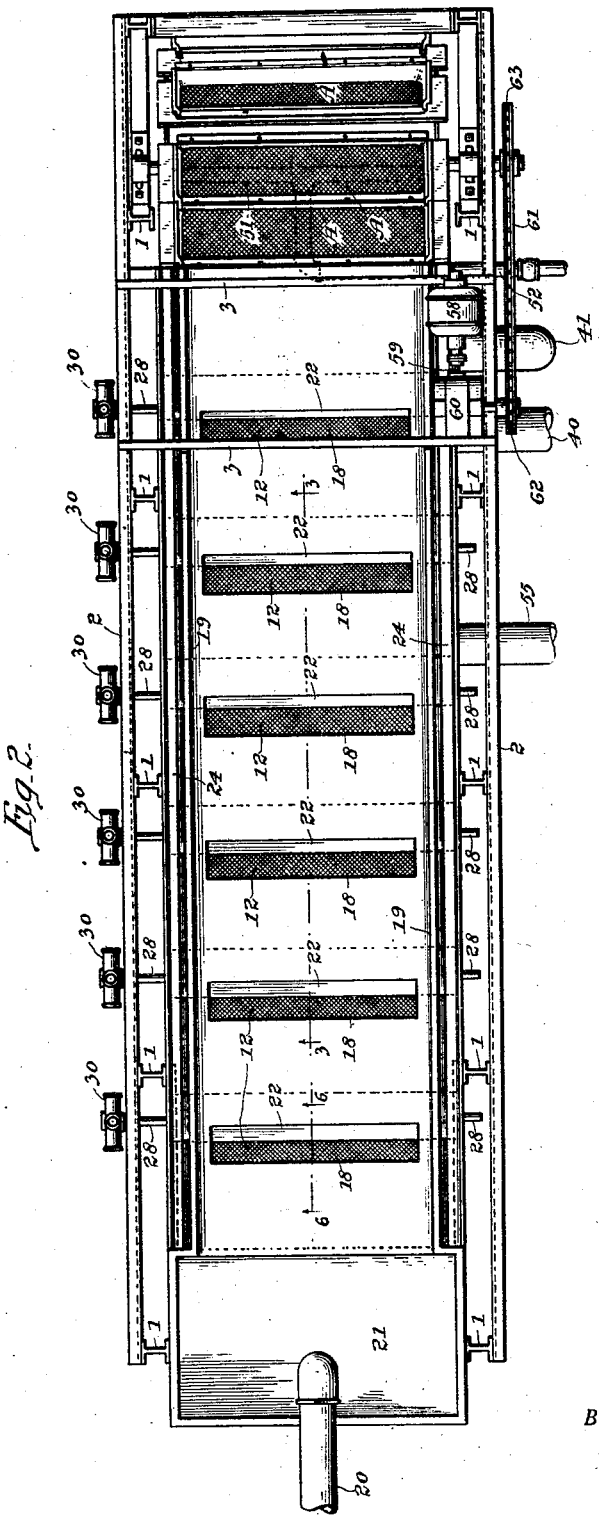
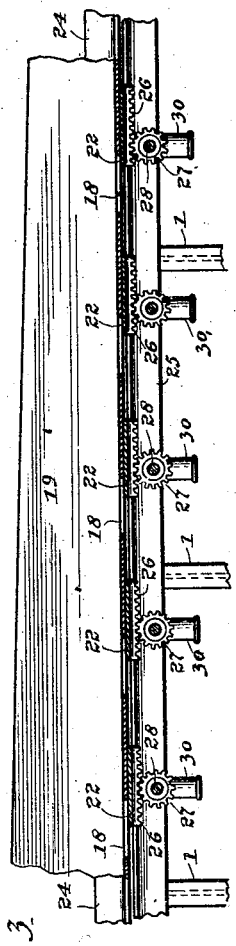
INVENTOR.
Edwin M. Bassler
BY
ATTORNEY.

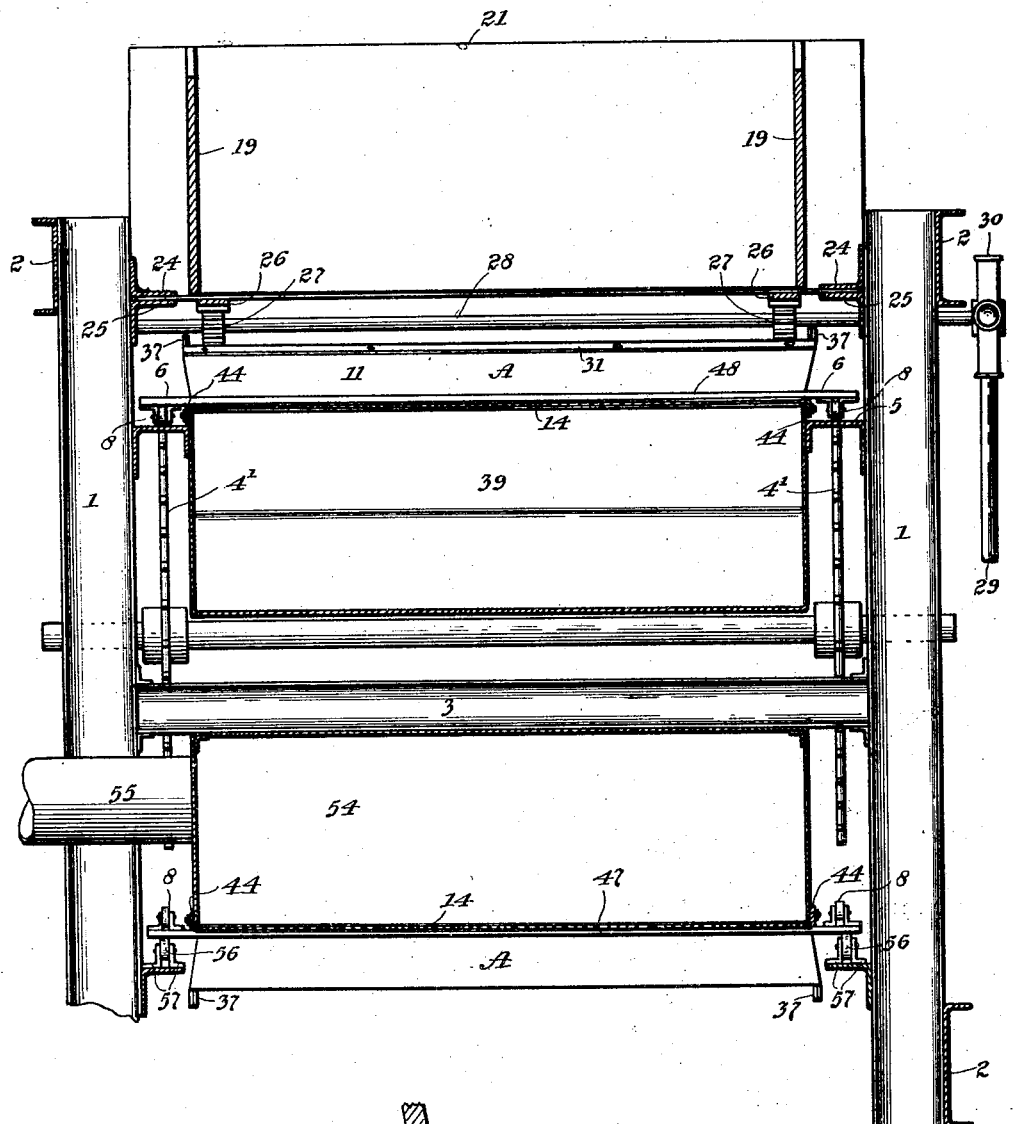
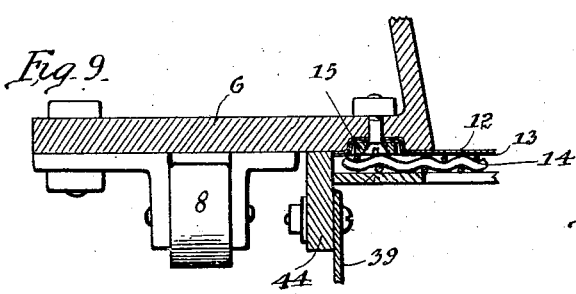

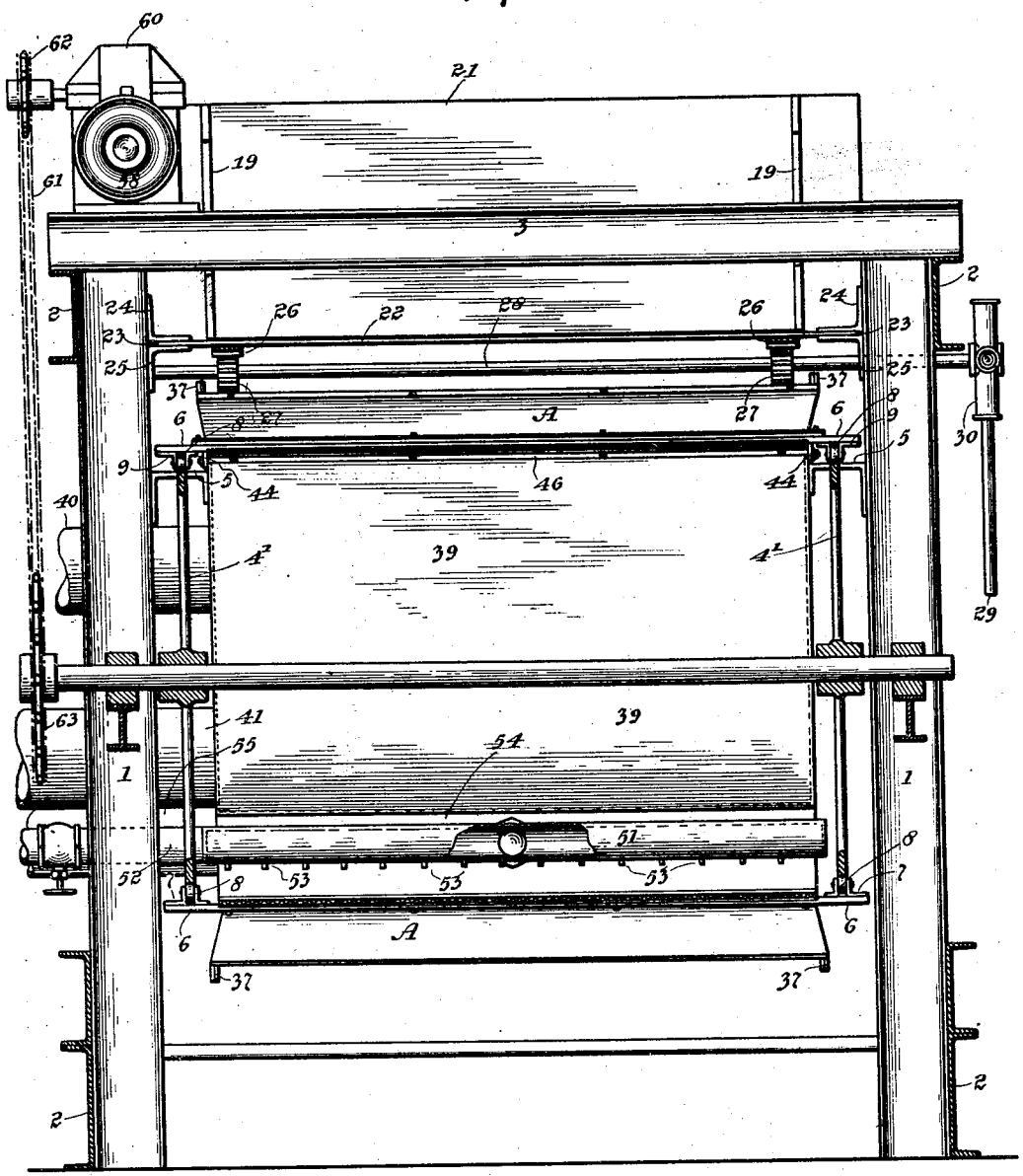

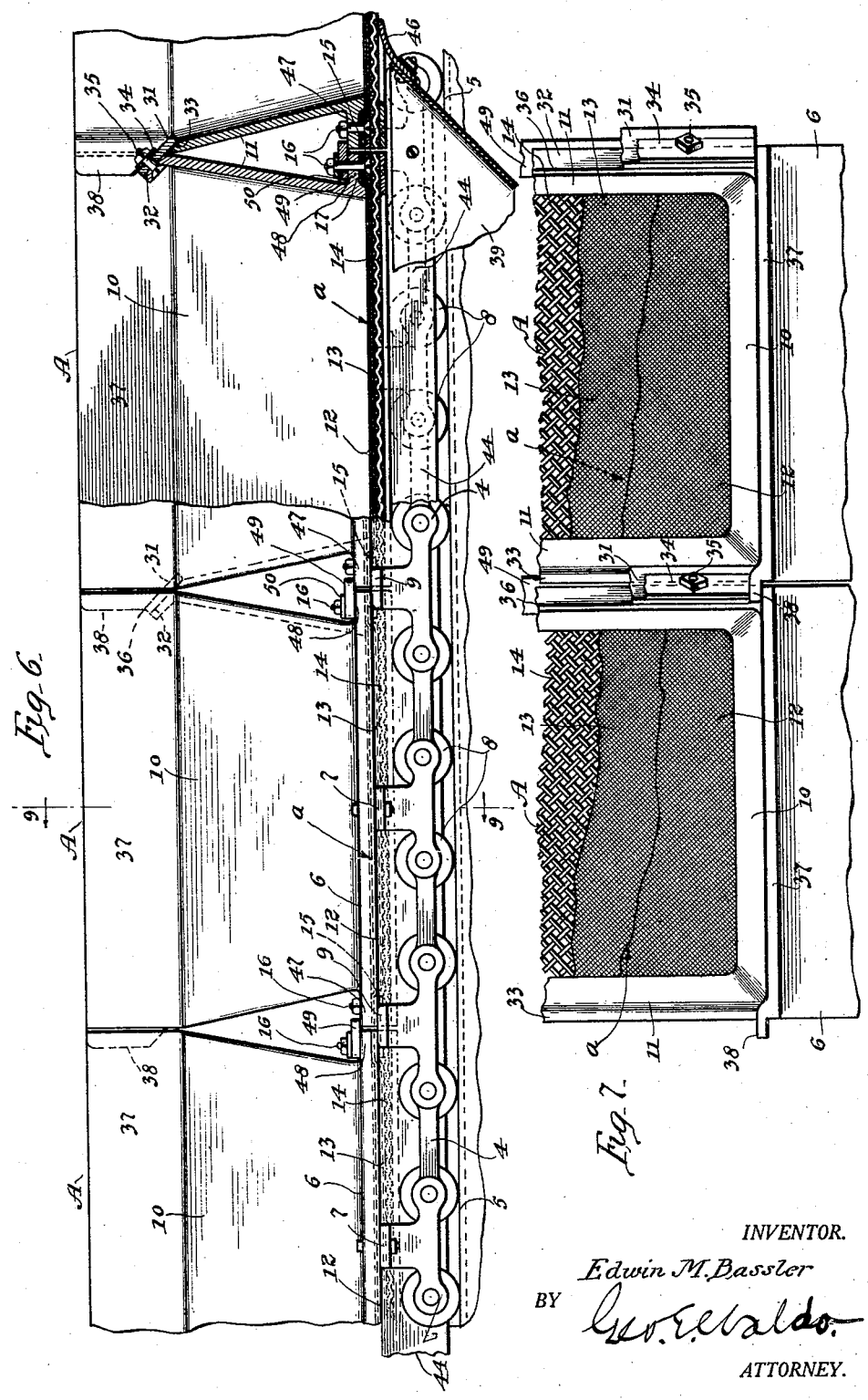

Patented Feb. 17, 1931

1,793,449

UNITED STATES PATENT OFFICE

EDWIN M. BASSLER, OF WAUSAU, WISCONSIN, ASSIGNOR TO D. J. MURRAY MANUFACTURING COMPANY, OF WAUSAU, WISCONSIN, A CORPORATION OF WISCONSIN

FILTER

Application filed November 1, 1927. Serial No. 230,229.

This invention relates to filters.

As is generally well known, in many industries in which the recovery or separation of residual solids from liquids in which they are held in suspension is effected by filtration, it is practically impossible to effect filtration on a commercial scale with any form of filter heretofore available, without large loss of the residual solids, due to the fact that they are not caught by the filters. A specific instance of such loss occurs in the case of what is known as "white water", which is the filtrate from the sheet laying or forming mechanism of a paper making machine, which always contains a considerable quantity of pulp, which at present runs to waste with the liquid filtrate and in many cases represents a large commercial loss, usually averaging from 2 to 4 pounds of pulp per 1000 gallons of white water, or with a machine which handles from 1000 to 1200 gallons of water per minute about 3 tons of pulp in 24 hours.

A principal object of the present invention is to prevent this loss, by providing a filter screen which, while permitting the liquid filtrate to pass freely through it, will catch a much greater percentage of the pulp or other residual solid than any other commercial filter of which I have any knowledge, thus reducing the loss of residual filtrates to a minimum.

Stated generally, the object of the invention is to provide a filter screen of relatively high effectiveness in operation as compared with present filter screens of which I have any knowledge.

Stated broadly, I attain the object of the invention as it relates to increasing the effectiveness in operation of the filter by the use of a filter screen consisting of a plurality of plies of filter fabric, as wire fabric, which overlie and rest in contact with one another.

As applied in use, filter screens embodying my invention and improvements may readily be adapted to almost any form or type of filter in which a filter screen is used. I do not, therefore, desire to limit myself to use of my improved filter screen in any particular application or on any particular form or type of filter, but it is my desire and intention to protect myself in the use of my improved filter screen, when utilized or embodied in any form or type of filter to which it may be adapted.

What I now consider to be preferable form of filter which is particularly well designed and adapted for advantageously utilizing filter screens embodying my invention and improvements, comprises a plurality of what may be designated filter pans, the bottom of each of which comprises a plurality of plies of filter fabric, preferably wire fabric, secured thereto so that their adjacent sides will rest in contact with each other; a suitable conveyor, consisting preferably of chain belts, to which said filter pans are secured in series; rotatably supported sprocket wheels to which said chain belts are adjusted; means for rotating said sprocket wheels, thus imparting movement in a continuous cycle to the filter pans secured thereto; and means for discharging liquid to be filtered into said filter pans as they traverse the top lap of the conveyor.

Preferably, also, said filters comprise perforate supporting means secured to the undersides of the filter pans outside of the filter screens secured thereto, respectively, adapted to relieve said filter screens from practically all stresses to which, otherwise, they might be subjected in operation.

What I now consider to be a preferable form of support for this purpose consists of wire screen of relatively large mesh and made of relatively large and strong wire.

Preferably, also, my improved filter comprises means for applying suction to the undersides of the filter pans during filtration, thus materially increasing the capacity of the filter though, at the same time, slightly reducing its effectiveness in operation, that is, the percentage of residual filtrate which will be recovered thereby as compared with the percentage of such filtrate recovered with said filter operating under gravity alone.

Said filter also comprises the various other features, combinations of features, and details of construction hereinafter described and claimed.

In the accompanying drawings in which said filter is fully illustrated,

Figure 1 is a side elevation of what I now consider to be a preferred form of filter embodying my invention and improvements.

Figure 2 is a top plan view thereof.

Figure 3 is an enlarged, fragmentary sectional side view thereof, substantially on the line 3—3 of Fig. 2.

Figures 4 and 5 are enlarged, sectional elevations taken substantially on the lines 4—4 and 5—5, respectively, of Fig. 1;

Figure 6 is an enlarged, fragmentary side view, partly in section, of the filter proper.

Figure 7 is an enlarged fragmentary plan view thereof, parts being broken away to disclose underlying parts; and Figures 8 and 9 are enlarged, fragmentary views illustrating certain details of construction.

Describing the invention with particular reference to the drawings, the operative parts of the machine are mounted upon a suitable frame consisting, as shown, of upright members 1, which are rigidly connected by longitudinal and transverse frame members 2 and 3.

Considered in detail, the construction of the frame of the machine is to a very large extent unimportant, and my invention contemplates the use of any desired or approved frame upon which the operative parts of the filter may be supported.

The filter proper consists of a plurality of what may appropriately be designated filter pans designated, as a whole A, said filter pans being connected in series to a suitable conveyor consisting, as shown, of chain belts 4, adjusted to sprocket wheels 4', to which said filter pans are secured. To prevent sagging of the top lap of said chain belts under the weight of the filter pans and of the liquid to be filtered supplied thereto in operation as previously described, the top laps of said chain belts are preferably supported on tracks 5 secured to the frame of the filter, said tracks preferably consisting of angle bars secured to the inner sides of the upright frame members 1.

The conveyor belts 4 and filter pans A form in effect, what may be referred to as a filter belt and for purposes of convenient reference will hereinafter be so designated. In the drawings, said filter belt is designated as a whole B.

As shown, the filter pans are secured to the chain belts 4, by means of flanges 6 formed at the lower side edges of said filter pans, which are riveted or otherwise rigidly secured to flanged lugs 7 formed on links of the chain belts, said lugs 7 being secured to the flanges 6 substantially at the longitudinal centers of the filter pans, thus permitting the chain belts to flex freely around the sprocket wheels 4'.

Also, to reduce friction and the power required for operating the filter proper, antifriction rollers 8 are preferably mounted at the connected ends of the links of said chain belt, in a usual manner.

Also, formed on links of the chain belts 4, intermediate the links to which the filter pans A are secured directly, are flanged lugs 9, the length of the links of said chain belt being so proportioned to the dimension of the filter pans A lengthwise of the chain belts that, as assembled for use, the lugs 9 will be positioned directly beneath the adjacent ends of adjacent filter pans, the relation being such that the adjacent ends of both adjacent pans will rest upon said lugs 9 while said filter pans are traversing the top lap of the conveyor, during which time the filter belt B runs on the tracks 5.

In order to reduce the weight of the filter pans A, they are preferably made of aluminum or other light metal, thus correspondingly reducing the power required for operating the same.

The construction of the filter pans A will now be described in detail. However, as said filter pans are all substantially identical in construction, one description will suffice for all and the following description is accordingly in the singular.

Each filter pan A consists of side and end walls designated, respectively, 10 and 11, the flanges 6, by means of which the filter pan is secured to the chain belts 4, being formed at the lower edges of the side walls 11 thereof.

Secured over the bottom of the pan, which is otherwise open, is a filter screen, designated as a whole, a, consisting of a plurality —specifically two—plies of suitable filter fabric, preferably woven wire fabric, designated, respectively, 12 and 13, and secured to the bottom of said filter pan outside of said filter screen is a member 14, which will sustain the weight of the water to be filtered, supplied to and contained in said pan, preventing sagging and distortion of said screen and also preventing injury to the filter screen by objects or parts of the filter with which it might come into contact in operation. Said member 14 is provided with openings adapted to permit liquid filtrate to pass freely through the same. As shown, said member consists of a piece of coarse woven wire fabric, the wires of which are sufficiently large to impart adequate strength to the structure, say about 1/8" in diameter.

The mesh of the fabric forming the filter screen a, may vary considerably with the kind of material to be filtered, but for general purposes, I prefer to make said filter screens from wire fabric having about 70 wires to the inch.

The filter screen a and bottom member 14 are made of the same length as the bottom of the filter pan A but their lateral edges terminate inside of the chain belts 4.

The plies of woven wire fabric 12 and 13 forming the filter screen a, are secured to the bottom of the pan A by means of bars 15 secured to the bottom of the body portion of the pan adjacent to the edges of the opening therein, preferably by means of bolts 16, which extend through holes formed in said bars 15 and in the flanges at the lower edges of said pan.

Also, to provide for drawing the filter screen taut and for holding the same securely in position, a groove 17 is formed in the bottom of the filter pan entirely around the opening therein, adapted to receive the filer screen a and the clamping bars 15. In the preferable construction shown, the bars 16 and groove 17 are substantially rectangular in cross-section. With the described construction, it is obvious that when the fastening screws 16 are tightened, they will force the strips or bars 15 into the groove 17 together with the portions of the filter screen a which underlie said bars, thus drawing said filter screen taut and also preventing slipping and loosening thereof, in the manner desired.

The liquid to be filtered is adapted to be supplied to the filter pans A through holes 18 formed in the bottom of a trough 19 supported on the frame of the machine above the top lap of the filter belt B, to which liquid to be filtered is adapted to be supplied through a pipe 20, which communicates with a suitable pump, not shown, having suction connection with a source of supply. As shown, the supply pipe 20 delivers directly into what may be called a well 21 with which the trough 19 communicates at a distance above the bottom of said well, the bottom of the trough declining gradually from said well to its outer end.

As shown, a series of holes 18 is formed transversely in the bottom of the trough, said holes being preferably arranged substantially equal distances apart and increasing in size away from the well 21.

To obtain the highest efficiency in operation, it is desirable that during the interval that the filter pans A are passing beneath the trough 19, a sufficient quantity of liquid to be filtered shall be supplied to said pans through each of the holes 18, to keep said pans approximately full, but without overflowing said pans. To effect this end, my improved filter preferably comprises gates or valves for controlling and varying the sizes of said holes or opening to secure, as near as may be, the operating conditions desired. In the preferable construction shown, the gates or valves which control said holes or openings 18, respectively, consist of plates 22 slidably supported in contact with the underside of the bottom of the trough 19 in such relation to the holes 18, respectively, that they may be moved in opposite directions relative to the direction of movement of the filter belt to separately open or close said holes, either partially or fully.

As shown, said gates or valves are supported and guided and the means for operating the same are as follows:—Formed on the machine frame at opposite sides of the filter belt B, are grooves 23 to which the ends of the plates forming said gates or valves are slidably fitted. As shown, said grooves are formed by the spaced, overlapping sides or faces of angle bars 24 and 25 secured to rigid parts of the machine, as to the upright frame members 1.

Secured to the undersides of said gates or valves, respectively, adjacent to opposite lateral edges thereof, are rack bars 26, which respectively intermesh with pinions 27 secured to shafts 28 rotatably mounted, respectively, in bearings on the machine frame, which are adapted to be turned in opposite directions—to open or close said gates or valves, as the case may be—by handles 29 secured in heads 30 secured to said shafts respectively.

With the described construction, it is obvious that the gates or valves 22 and thus the sizes of the holes or openings 18 may be separately adjusted to secure any operating relation desired.

As the filter belt B passes beneath the openings 18 in the trough 19 in the operation of the filter, it is obvious that liquid to be filtered will be discharged into the filter pans A through said openings, whence it will drain through the filter screens a and the bottom members 14, the residual filtrate being caught by and held upon the filter screens, from which it is later removed by any suitable means, as presently described.

Obviously, as the end walls 11 of the filter pans A pass under the openings 18, water discharged through said openings will tend to flow downwardly through any spaces which may be formed between the adjacent walls of adjacent filter pans. To prevent this, means are preferably provided for sealing the spaces between the adjacent end walls of adjacent filter pans, thus preventing leakage between them. As shown, the means for this purpose consists of strips of rubber 31 secured to frontwardly and downwardly inclined surfaces 32 formed on the front walls 11 of said filter pans, respectively, the free ends of which are adapted to overlap and rest in contact with correspondingly inclined surfaces 33 formed on the rear end walls of the next adjacent front filter pans, respectively. As shown, the rubber strips 31 are clamped between the inclined surfaces 32 on the end walls 11 and bars 34 by means of bolts 35. Also, the means for supporting and securing the rubber strips in position are constructed and arranged to form sharp angular surfaces, as shown at 36, which will operate in an obvious manner, to prevent splashing of the water and also to deliver the liquid to be filtered into filter pans between which said surfaces are positioned.

Also, to prevent the liquid to be filtered—discharged into the filter pans A from the trough 19 through the holes 18—from overflowing the sides of said filter pans and running to waste, the side walls 10 of said filter pans are made higher than the end walls 11 thereof, as shown at 37, corresponding ends of said extensions—as shown the front ends—projecting frontwardly beyond the front walls 11 of the filter pans and being off-set to overlap the rear ends of the upwardly extending side walls of the next adjacent front filter pan, when the filter belt B is traversing the top lap of its cycle, all as shown at 38. The adjectives "front" and "rear" as applied to the filter pans A and the walls thereof, have reference to the direction of movement of the filter belt B. But, as applied to the filter generally, "front" designates the end of the filter at which the liquid to be filtered is supplied, and "rear" the opposite end thereof.

In the preferable construction shown, also, a pan 39 is mounted on the frame of the machine, the bottom, side and end walls of said pan being closed and the top side thereof being opened and extending into close proximity to the underside of the filter belt B as it traverses the upper lap of the cycle described by said filter belt, which is supported upon the tracks 5.

Communicating with the pan 39, preferably at a distance above the bottom thereof, is a pipe 40 adapted for connecting said pan with a pump, not shown, thereby providing for maintaining a vacuum in said pan which will operate, in an obvious manner, to increase the flow of liquid through the filter screens a, as compared with the capacity of said filter operating under gravity alone.

Liquid filtrate is adapted to be discharged from the pan 39 through a discharge pipe 41 which communicates therewith substantially at the apex of the angle defined by the converging bottom and rear end wall of said tank.

For purposes of convenient reference, the pan 39 will hereinafter be referred to as a vacuum pan.

I desire it to be understood, however, that my invention contemplates operating the filter under gravity alone instead of with suction, in which case the pan 39 will operate merely to catch the liquid filtrate from the filter, which is discharged therefrom through the discharge pipe 41 in the same manner as when suction is used.

As shown, the lower end of the discharge pipe is closed by a water seal consisting of a well 42 into which said pipe discharges, said well being provided with a discharge opening or connection 43 positioned above the lower end of said discharge pipe, thus preventing the admission of air to said discharge pipe. Obviously, by making the discharge pipe 41 of considerable length, a head of water will be maintained therein, the weight of which will operate to maintain a substantially constant vacuum in the pan 39.

To prevent leakage of air into the vacuum pan 39, means are provided for sealing the spaces between the upper edges of said vacuum tank and the bottom of the filter belt B; and also for closing the spaces between adjacent filter pans closely adjacent to their bottoms.

As shown, the means for sealing the spaces between the upper edges of the side walls of the vacuum pan 39 and the filter belt, consists of strips of rubber 44 secured to the side walls of said vacuum tank, the free upper edges of which are adapted to contact with the undersides of the flanges 6 formed on the lower edges of the side walls 10 of the filter pans A, between the lateral edges of the filter screen a secured to said filter pans and the chain belts 4, as clearly shown in Fig. 5.

In like manner, the spaces between the upper edges of the front and rear end walls of said vacuum pan and the bottoms of the filter pans A, are sealed by relatively long and flexible strips of rubber 45 and 46 secured to the upper edges of the front and rear end walls, respectively, of the vacuum pan, said strips of rubber being proportioned to fit snugly between the rubber strips 44 secured to the side walls of said vacuum pan and their free ends being disposed rearwardly from the end walls of the vacuum pan to which they are secured, respectively, and lying in contact with the underside of the filter belt. Obviously, in order that liquid to be filtered, discharged into the filter pans A will drain into the vacuum pan 39, it is necessary that, as the filter pans pass the front sealing strip 45, the rear walls thereof shall pass the free end of said sealing strip before their front walls pass beneath the front liquid supply opening 18.

Also, preferably, the means for sealing the spaces between the lower edges of adjacent end walls of adjacent filter pans is as follows: Formed on the front and rear end walls of said filter pans, respectively, adjacent to their lower edges, are narrow flanges 47 and 48, and secured to one of said flanges—as shown, to the rear flanges 48—are rubber strips 49, the free, front ends of which extend over and rest in contact with the flanges 47 of the next adjacent front filter pan. As shown, the rubber strips 49 are clamped in position between the top sides of the flanges 48 and clamping bars 50, by means of bolts extending through the same, which, as shown, are the same bolts by which the front and rear edges of the filter screens *a* are secured to the bottoms of the filter pans.

After the filter belt B has traversed the top lap of its cycle, the residual filtrate deposited on the filter screens *a* is removed therefrom. This may be done in a simple manner, either by discharging sprays of liquid against the outer sides of the bottoms of the filter pans when they are in substantially inverted position, as when they reach the position of the pan designated A', Fig. 1, said liquid spray operating to wash the residual filtrate from the filter screen *a*, thus cleansing said filter screens and restoring their original efficiency; or, if it is desired to remove the residual filtrate in a relatively dry state, it may be removed from the filter screens by subjecting the outer sides of the bottoms of the filter pans to air pressure sufficient to blow the residual filtrate off from said filter screens.

Simple means for discharging liquid sprays against the filter belt consists of a header 51, see particularly Figs. 1 and 4, supported between the sprocket wheels 4' at the rear end of the machine, at the inner side of and closely adjacent to the filter belt where it diverges from the undersides of the sprocket wheels 4', where the filter pans *a* are in substantially upside-down position. The header 51 is connected with any suitable source of supply of liquid under pressure, not shown, by a pipe 52 and secured in openings formed in the underside of said header are spray nozzles 53 adapted to discharge liquid sprays against the outer sides of the bottoms of the filter pans, whence it passes through the meshes of the supporting members 14 and of the filter screens *a*, washing the residual filtrate therefrom and cleansing said filter screens so as to restore their effectiveness.

As shown, also, the means for removing residual filtrate from the filter screens comprises a box-shaped receptacle 54 supported on the frame of the machine inside of the filter belt B. The bottom of said receptacle is open and is positioned closely adjacent to the inner side of the filter belt, the spaces between the side and end walls of said receptacle being sealed by rubber strips secured thereto and the free ends of which contact with the bottoms of the filter pans A, all substantially in the same manner as in the case of the vacuum pan heretofore described.

The interior of the chamber formed by the receptacle 54 is adapted to be connected with a source of supply of air under pressure, not shown, by a pipe 55.

Also, to insure proper contact of the sealing strips on said pressure receptacle or chamber 54 with the filter belt B, means are provided for supporting the lower lap of said filter belt beneath said pressure chamber. As shown, said supporting means consists of idle rollers 56 rotatably mounted on angle bars 57 secured to the machine frame at opposite sides of the filter belt in position so that the sides of the flanges 6 opposite to the side thereof to which the filter screens *a* are secured, will run upon and be supported by said rollers as the filter belt passes beneath said pressure chamber.

With the described construction, it is obvious that the residual filtrate may be removed from the filter screens either by water sprays or air pressure, as may be desired.

The residual filtrate dislodged from the filter belt B may be caught and disposed of by any usual or desired means and can readily be supplied by skilled mechanics and need not, therefore, be shown or described in detail.

Rotation is adapted to be imparted to the rear sprocket wheels 4' by means of suitable driving connections between the shaft on which said sprocket wheels are mounted and a suitable source of power.

As shown, said shaft is driven by an electric motor, indicated at 58, the shaft of which is coupled directly to the worm of a worm gear, the worm of which is secured to a shaft 59 rotatably mounted in suitable bearings in the casing 60 of said worm gear, said sprocket wheel shaft being driven direct from the worm shaft 59 by means of a chain belt 61 adjusted to sprocket wheels 62 and 63 secured to said worm shaft and to the sprocket wheel shaft, respectively.

I claim:

1. In a filter, the combination of a plurality of filter pans having imperforate side and end walls and an open bottom, a filter screen secured in the open bottom of each thereof, and means for connecting and feeding said filter pans in series.

2. A filter as specified in claim 1, in which the filter screens of the filter pans, respectively, consist of a plurality of plies of filter fabric, the adjacent sides of adjacent plies of which contact with one another.

3. A filter as specified in claim 1, which also comprises means for drawing the filter screens taut comprising grooves formed in the bottoms of the body portions of the filter pans surrounding the openings in the bottoms thereof, respectively, and bars secured in said grooves outside of the filter screens.

4. A filter as specified in claim 1, in which the body portions of the pans, respectively, comprise laterally projecting flanges at the lower edges of their side walls arranged for making conveyor attachments to their undersides.

5. A filter as specified in claim 1, in which the means for connecting and feeding the filter pans comprises rotatable members, and belts adjusted thereto to which said filter pans are connected.

6. A filter as specified in claim 1, in which the means for connecting and feeding the filter pans comprises rotatable members, and belts adjusted thereto to which said filter pans are connected, the points of attachment of said filter pans to said belts being positioned substantially in the transverse centre lines of said filter pans, respectively.

7. A filter as specified in claim 1, in which the means for connecting and feeding the filter pans comprises sprocket wheels rotatably mounted in pairs both longitudinally and transversely, and chain belts adjusted to said longitudinally arranged pairs of sprocket wheels to which said filter pans are secured.

8. A filter as specified in claim 1, which comprises means to prevent leakage between adjacent walls of adjacent filter pans.

9. A filter as specified in claim 1, which comprises means to prevent leakage between adjacent walls of adjacent filter pans comprising a strip of suitable flexible material secured to an end wall of one of said filter pans and which extends over and rests in contact with the adjacent end wall of the adjacent filter pan.

10. A filter as specified in claim 1, which comprises means to prevent leakage between adjacent walls of adjacent filter pans, comprising a strip of suitable flexible material secured to an end wall of one of said filter pans in inclined position and which extends over and rests in contact with the adjacent end wall of the adjacent filter pan.

11. A filter as specified in claim 1, which comprises means to prevent leakage between adjacent walls of adjacent filter pans, comprising a strip of suitable flexible material secured to an inclined surface on an end wall of one of said filter pans and which extends over and rests in contact with a correspondingly inclined surface on the adjacent end wall of the adjacent filter pan.

12. A filter as specified in claim 1, which comprises means to prevent leakage between adjacent walls of adjacent filter pans, comprising a strip of suitable flexible material secured to a downwardly and frontwardly inclined surface formed on the front walls of said filter pans, respectively, and which extends over and rests in contact with correspondingly inclined surfaces on the adjacent end walls of adjacent filter pans.

13. A filter as specified in claim 1, which comprises means to prevent leakage between adjacent walls of adjacent filter pans constructed and arranged to form surfaces at the tops of end walls of the filter pans which are angular in cross-section and the sides of which diverge downwardly.

14. A filter as specified in claim 1, in which the side walls of the filter pans extend above the end walls thereof.

15. A filter as specified in claim 1, in which the side walls of the filter pans extend above the end walls thereof and adjacent ends of the side walls of adjacent filter pans over-lap.

16. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between the upper edges of the pan and the bottom of the filter belt and between the lower edges of the end walls of adjacent filter pans.

17. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between the upper edges of the pan and the bottom of the filter belt, said sealing means comprising strips of suitable material secured to the upper edges of the side walls of the vacuum pan the upper edges of which contact with the bottoms of the filter pans passing over the same outside of the filter screens thereof.

18. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between the upper edges of the pan and the bottom of the filter belt, said sealing means comprising strips of suitable flexible material secured to the front and rear end walls of the filter pans which extend a short distance rearwardly from said walls, respectively, and the free ends of which contact with the bottoms of the filter pans as they pass over the same.

19. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between the upper edges of the pan and the bottom of the filter belt, said sealing means consisting of strips of suitable material secured to the upper edges of the side walls of the vacuum pan the upper edges of which contact with the bottoms of the filter pans passing over the same outside of the filter screens thereof, and strips of suitable flexible material secured to the front and rear end walls of the filter pans which extend a short distance rearwardly from said walls, respectively, and the free ends of which contact with the bottoms of the filter pans as they pass the same, and which fit closely between the strips of material secured to the upper edges of the side walls of the vacuum pan.

20. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between the adjacent end walls of adjacent filter pans, comprising shoulders formed thereon, respectively, and a strip of suitable flexible material secured to a shoulder on each of said filter pans which extends over and rests in contact with the shoulder on the adjacent end wall of the adjacent filter pan.

21. In a filter, the combination of a plurality of filter pans, the bottom of each of which comprises a filter screen, means for connecting and feeding said filter pans in continuous series, a pan which underlies the portion of said series of filter pans at which filtration occurs adapted to catch the liquid filtrate therefrom, a pipe adapted for connecting said pan with suction means, a water discharge pipe from said pan, and means for sealing the spaces between adjacent end walls of adjacent filter pans, comprising shoulders formed thereon, respectively, and a strip of suitable flexible material secured to the shoulder at the front end of each filter pan which extends over and rests in contact with the shoulder at the rear end of the next adjacent front filter pan.

In witness that I claim the foregoing as my invention, I affix my signature this 24th day of October, 1927.

EDWIN M. BASSLER.